July 13, 1926.
A. M. BOYD
1,592,175
ELECTRIC INSULATION FOR METAL PIPES
Filed July 10, 1924
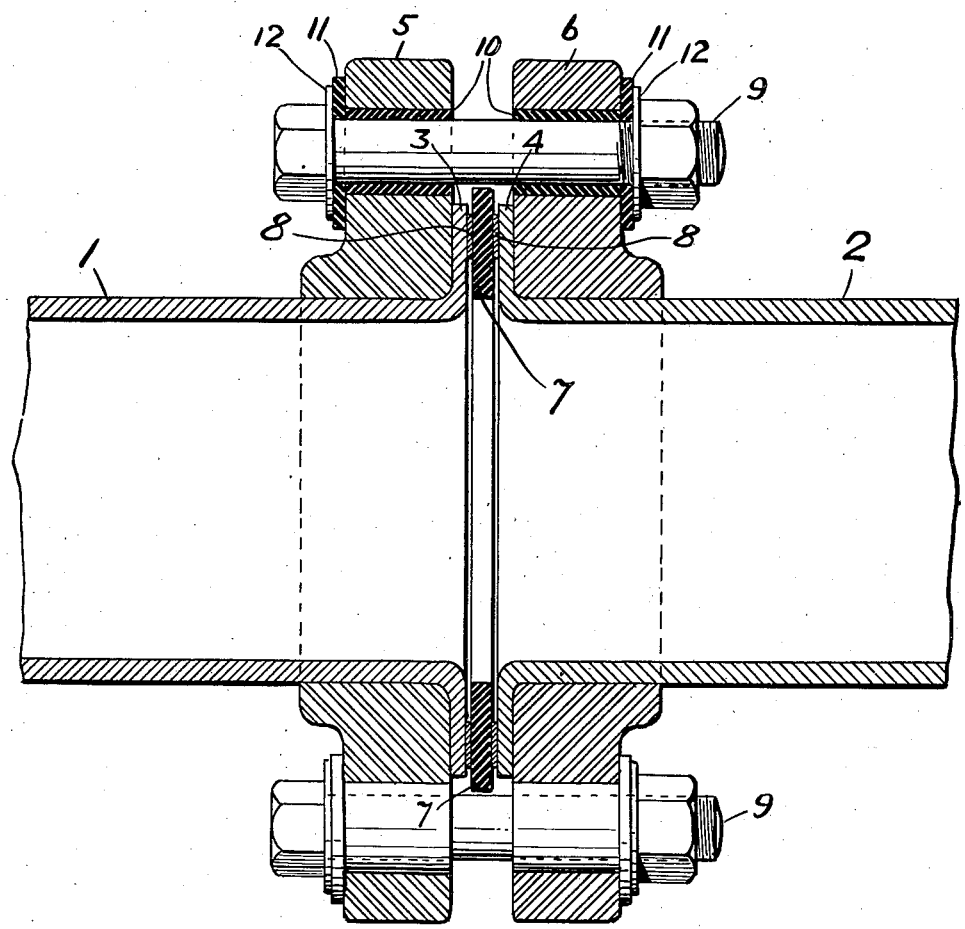
WITNESS:
Rob R Kitchel.
INVENTOR
Albert M. Boyd
BY
Augustus B Stoughton
ATTORNEY Patented July 13, 1926.

1,592,175

UNITED STATES PATENT OFFICE.

ALBERT M. BOYD, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE.

ELECTRIC INSULATION FOR METAL PIPES.

Application filed July 10, 1924. Serial No. 725,267.

The principal object of the present invention is to prevent or oppose the deterioration of steel mains or metal pipes through electrolysis. Another object of the invention is to provide an efficient, durable and reliable electric insulation for sections of steel mains or metal pipes.

Other objects of the invention will appear from the following description and the invention will be claimed at the end hereof but, generally stated, it may be said to comprise a pair of tubular metal elements adapted for insertion in a pipe line and having integral confronting end flanges between which there is arranged a metal faced electrically insulating washer, together with a metal clamp mounted on said elements and provided with electrically insulated bolts spaced clear of said washer and adapted for drawing the end flanges up to said metal faced washer or gasket.

In the following description reference will be made to the accompanying drawing forming part hereof and in which the single figure is a longitudinal sectional view of so much of electric insulation for metal pipes as is necessary for an illustration of the invention.

In the drawing 1 and 2 are a pair of tubular metal elements of which parts only are shown for lack of room on the sheet and they are adapted for insertion in a pipe line. These elements are provided with end flanges 3 and 4 arranged in spaced confronting relation. The confronting surfaces of these flanges may be machined or otherwise finished or faced. 5 and 6 are clamp rings mounted on the elements 1 and 2, and they engage the flanges 3 and 4. There is a set of washers or gaskets interposed between the faces of the flanges 3 and 4, and of this set the fibre washer or gasket 7 is of electrically insulating material, and the outside washers or gaskets 8 are of lead or like soft metal and they serve to insure continuity and tightness of the fluidway. Bolts 9 engage the clamp rings and are adapted to draw them towards each other. As shown the bolts are spaced clear of the rim of the washer 7, and the washer 7 is wider than the washers 8, and the washer 7 extends both inward and outward beyond the washers 8. 10 are thimbles of electrically insulating material and they encircle the bolts and extend through the bolt holes provided in the clamp rings. A pair of washers 11 and 12 are arranged between the rings 5 and 6, and the bolt. Of these washers the one, 11, next the ring is of electrically insulating material, and the other washer 12, is of metal and is smaller than the washer 11. The thimbles 10 are spaced at their inner ends so that they in no way interfere with the drawing up of the clamp.

It will be observed that the elements 1 and 2 are thoroughly electrically insulated from each other. The insulating gasket 7 can well be made of appropriate size for strength and durability, and the lead or soft metal gaskets 8 while providing a tight joint also protect the insulating washer 7. Inasmuch as the insulating washers 7 and 11 project beyond the adjacent metallic washers they provide an extended insulating surface. As a whole the electric insulation is strong and durable. It will be understood that the tubular metal elements 1 and 2 are inserted into a pipe line of steel welded or screwed mains. The mains and the welding or screwing are not shown because they are too well understood to require illustration and moreover there is not sufficient room on the sheet. Electrolysis which causes deterioration in pipe lines and mains involves a conducting path for the flow of electric current and by the insertion of the described insulation at intervals in the line of pipe or main no such path is provided and consequently deterioration by electrolysis is avoided.

It will be obvious to those skilled in the art to which the invention relates that modifications may be made in details of construction and arrangement without departing from the spirit of the invention which is not limited as to those matters or otherwise than as the prior art and the appended claims may require.

I claim:

1. Electric insulation for metal pipes comprising a pair of tubular metal elements adapted for insertion in a pipe line and having integral end flanges arranged in spaced confronting relation, clamp rings mounted on said elements and engaging said flanges, a set of washers or gaskets interposed between the faces of said flanges and whereof the middle one is of electrically insulating material and whereof the outside ones are of metal, bolts engaging the clamp rings and spaced clear of said washers and adapted to draw them towards each other, thimbles of insulating material encircling the bolts and extending through bolt holes provided in the rings, and a pair of washers between each of the rings and the bolts and of which the one next the ring is of insulating material and of which the other is of metal.

2. Electric insulation for metal pipes comprising a pair of tubular metal elements having integral end flanges, a metal faced electrically insulating washer interposed between said flanges, and a metal clamp mounted on said elements and engaging the end flanges and provided with insulated bolts spaced clear of the washer for drawing the end flanges up to the metal faces of the washer.

ALBERT M. BOYD.